US012786326B2

(12) United States Patent
Ichinowatari et al.

(10) Patent No.: US 12,786,326 B2
(45) Date of Patent: Nov. 3, 2026

(54) IMAGE PROCESSING APPARATUS HAVING LIGHT EMITTING DEVICE FOR PLACEMENT UNIT, NON-TRANSITORY COMPUTER READABLE MEDIUM STORING PROGRAM, AND IMAGE PROCESSING METHOD

(71) Applicant: FUJIFILM Business Innovation Corp., Tokyo (JP)

(72) Inventors: Yasushi Ichinowatari, Kanagawa (JP); Yuki Noguchi, Kanagawa (JP); Megumi Okubo, Kanagawa (JP); Miki Hagiwara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 2 days.

(21) Appl. No.: 18/188,489

(22) Filed: Mar. 23, 2023

(65) Prior Publication Data

US 2024/0089390 A1 Mar. 14, 2024

(30) Foreign Application Priority Data

Sep. 13, 2022 (JP) ................................ 2022-145653

(51) Int. Cl.
*H04N 1/00* (2006.01)
*H04N 1/028* (2006.01)

(52) U.S. Cl.
CPC ....... *H04N 1/0049* (2013.01); *H04N 1/00896* (2013.01); *H04N 1/0282* (2013.01)

(58) Field of Classification Search
CPC . H04N 1/00896; H04N 1/0049; H04N 1/0282
See application file for complete search history.

(56) References Cited

U.S. PATENT DOCUMENTS 6,965,460 B1 * 11/2005 Gann ..................... H04N 1/193 358/453
2007/0076268 A1 4/2007 Shojo et al.
2011/0228354 A1 * 9/2011 Fukui ................. H04N 1/19594 358/475
2012/0274996 A1 * 11/2012 Sakuma ............. H04N 1/00663 358/498

(Continued)

FOREIGN PATENT DOCUMENTS

JP 2002333669 11/2002
JP 2005086395 3/2005

(Continued)

OTHER PUBLICATIONS

"Search Report of Europe Counterpart Application", issued on Jan. 16, 2024, p. 1-p. 9.

(Continued)

*Primary Examiner* — Nicholas Pachol
(74) *Attorney, Agent, or Firm* — JCIPRNET

(57) ABSTRACT

An image processing apparatus includes a placement unit that is provided on an upper surface of a housing and on which a document is placed, an imaging unit that images the placement unit from above, a light emitting device that causes at least a part of the placement unit to emit light, and a processor configured to: control the light emitting device not to emit light, in a case where it is detected that the document is placed on the placement unit.

11 Claims, 8 Drawing Sheets

(56) References Cited

U.S. PATENT DOCUMENTS

| | | | | |
|---|---|---|---|---|
| 2013/0242356 | A1* | 9/2013 | Oshida | H04N 1/02815 358/474 |
| 2014/0071499 | A1* | 3/2014 | Hayashide | H04N 1/00013 358/474 |
| 2015/0116788 | A1* | 4/2015 | Oshima | H04N 1/19594 358/453 |
| 2017/0244853 | A1* | 8/2017 | Yabuuchi | H04N 1/00708 |
| 2017/0339292 | A1* | 11/2017 | Sakuma | H04N 1/00795 |
| 2018/0367694 | A1 | 12/2018 | Asakawa et al. | |
| 2019/0089860 | A1* | 3/2019 | Fuchigami | H04N 1/1061 |
| 2021/0127026 | A1* | 4/2021 | Miki | H04N 1/00896 |
| 2022/0124214 | A1 | 4/2022 | Ishida | |
| 2023/0060035 | A1* | 2/2023 | Koda | H04N 1/00477 |

FOREIGN PATENT DOCUMENTS

| | | |
|---|---|---|
| JP | 2007047362 | 2/2007 |
| JP | 2008271265 | 11/2008 |
| JP | 2010021830 | 1/2010 |
| JP | 2010136149 | 6/2010 |

OTHER PUBLICATIONS

"Notice of reasons for refusal of Japan Counterpart Application", issued on Aug. 4, 2026, with English translation thereof, pp. 1-10.

* cited by examiner

IMAGE PROCESSING APPARATUS HAVING LIGHT EMITTING DEVICE FOR PLACEMENT UNIT, NON-TRANSITORY COMPUTER READABLE MEDIUM STORING PROGRAM, AND IMAGE PROCESSING METHOD

CROSS-REFERENCE TO RELATED APPLICATIONS

This application is based on and claims priority under 35 USC 119 from Japanese Patent Application No. 2022-145653 filed Sep. 13, 2022.

BACKGROUND

(i) Technical Field

The present invention relates to an image processing apparatus, a non-transitory computer readable medium storing a program, and an image processing method.

(ii) Related Art

JP2005-086395A describes a mobile phone with a camera that is provided with a set of auxiliary light emitting units and can emit light as auxiliary light in a case of performing imaging by a plurality of imaging optical systems.

SUMMARY

Aspects of non-limiting embodiments of the present disclosure relate to an image processing apparatus, a non-transitory computer readable medium storing a program, and an image processing method that eliminate an influence of light emission of a placement unit at a time of imaging a document.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including: a placement unit that is provided on an upper surface of a housing and on which a document is placed; an imaging unit that images the placement unit from above; a light emitting device that causes at least a part of the placement unit to emit light; and a processor configured to: control the light emitting device not to emit light, in a case where it is detected that the document is placed on the placement unit.

BRIEF DESCRIPTION OF THE DRAWINGS

Exemplary embodiment(s) of the present invention will be described in detail based on the following figures, wherein:

FIG. 1A is a side view of the image forming apparatus and FIG. 1B is a front view of the image forming apparatus;

DETAILED DESCRIPTION

Figure 1B:
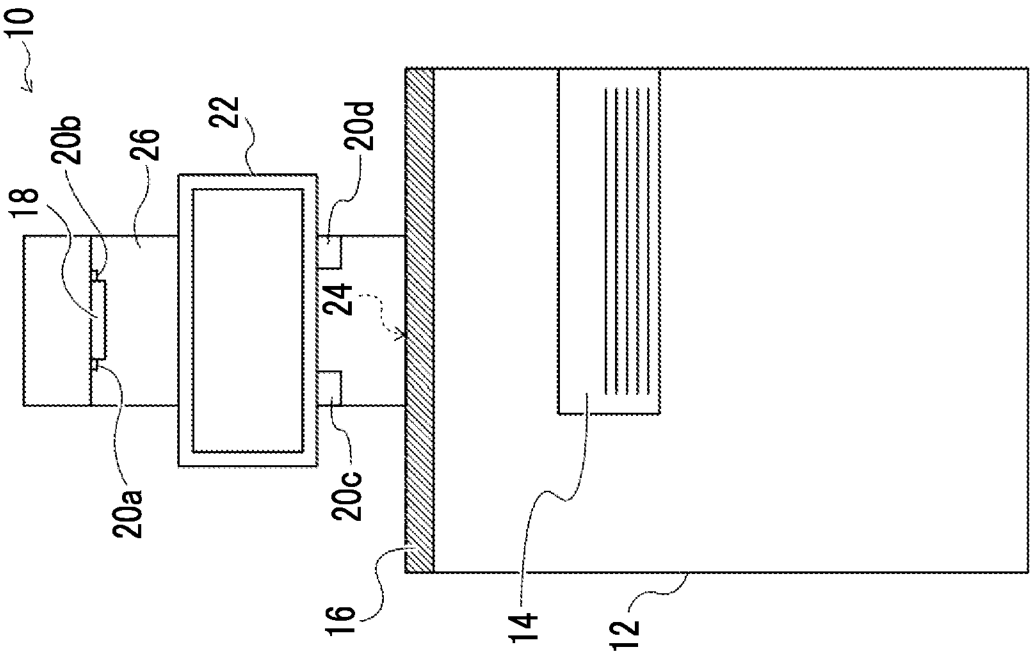
FIGS. 1A and 1B are views showing an external appearance of an image forming apparatus according to an exemplary embodiment of the present invention, where
Figure 1A:
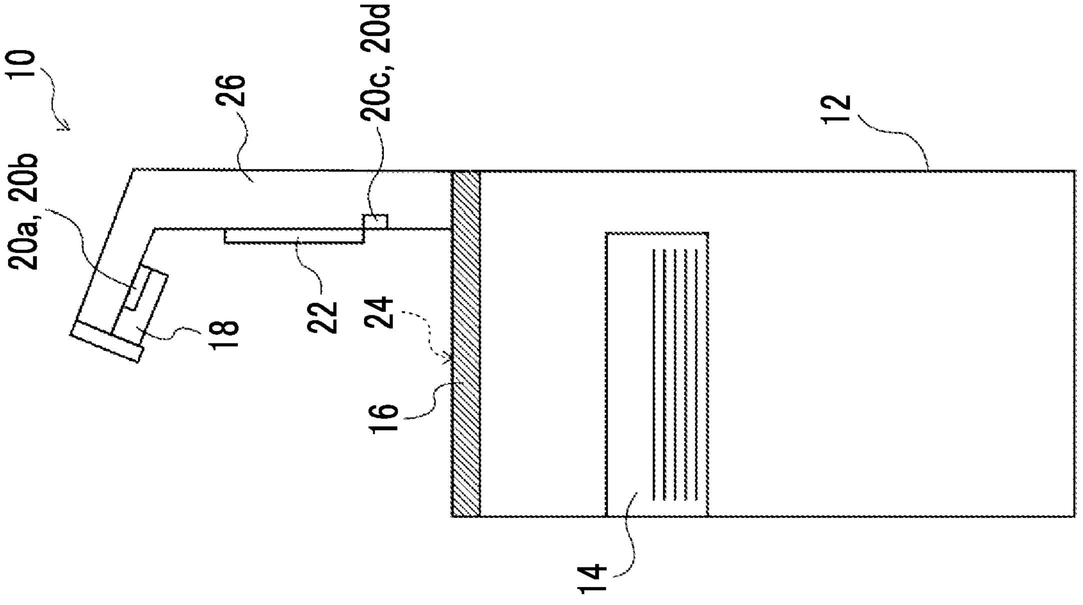

Hereinafter, an exemplary embodiment of the present invention will be described in detail with reference to the accompanying drawings. FIGS. 1A and 1B are views showing an external appearance of an image forming apparatus 10 as an example of an image processing apparatus according to an exemplary embodiment of the present invention, where FIG. 1A is a side view of the image forming apparatus 10 and FIG. 1B is a front view of the image forming apparatus 10. The image forming apparatus 10 is an apparatus installed in an office such as a multifunction machine.

As shown in FIGS. 1A and 1B, the image forming apparatus 10 includes an apparatus body 12, a discharge tray 14 as a medium discharge unit, a placement unit 16, an imaging device 18, an irradiation device 20 including four light sources 20*a*, 20*b*, 20*c*, and 20*d*, an operation panel 22, a light emitting device 24, or the like.

The discharge tray 14 is where paper, which is an example of a medium, is discharged. Further, the discharge tray 14 is provided at a position where the medium is taken out by the user in a standing state.

The placement unit 16 is a top surface of the apparatus body 12, to be described in detail later, and is disposed on an upper portion of the apparatus body 12. Further, the placement unit 16 is installed above the discharge tray 14 in the vertical direction. Further, the placement unit 16 is configured such that a document such as a paper, a business card, or a receipt can be placed.

Further, a document feeder having a double-sided simultaneous scanning function is provided inside the apparatus body 12 below the top plate of the placement unit 16. It is configured that the document feeder can be used by sliding a part of the top plate of the placement unit 16 in the plane direction.

The imaging device 18 includes an imaging element such as a charge coupled device (CCD), for example, and images a subject such as a document to acquire image data. The imaging device 18 is installed above the placement unit 16, and is configured to image the document placed on the placement unit 16 from above. Here, in a case where the upper surface of the placement unit 16 is used as the reference plane, the term "above the placement unit 16" is not limited to the position vertically above the reference plane, and means a position that is above in the vertical direction and is higher than the reference plane. The imaging device 18 is an example of an imaging unit in the technique of the present disclosure.

Further, a column 26 is provided on the top surface of the apparatus body 12 and on the back of the upper surface of the placement unit 16. The column 26 extends upward substantially perpendicular to the upper surface of the placement unit 16, and is provided with an end portion bent above the placement unit 16. The imaging device 18 is attached to an end portion of the column 26.

An image forming unit, which forms an image of a subject placed on the placement unit 16, is provided between the discharge tray 14 and the placement unit 16. That is, an image forming unit that forms an image on the paper discharged to the discharge tray 14 is provided above the discharge tray 14.

The irradiation device 20 includes one or more light sources such as, for example, a light emitting diode (LED), and includes, for example, the light sources 20*a*, 20*b*, 20*c*, and 20*d*. The light sources 20*a*, 20*b*, 20*c*, and 20*d* are provided on the column 26. That is, the light sources 20*a*, 20*b*, 20*c*, and 20*d* are provided above the placement unit 16.

Specifically, the light sources 20*a* and 20*b* are provided in the vicinity of the imaging device 18, downward on both sides of the imaging device 18 of the column 26. The light sources 20*c* and 20*d* are provided in the vicinity of the operation panel 22, obliquely downward on both sides of the column 26 at the lower end of the operation panel 22.

That is, the light sources 20*a* and 20*b* and the light sources 20*c* and 20*d* are arranged at positions with different heights from the placement unit 16. That is, the light sources 20*a*, 20*b*, 20*c*, and 20*d* are disposed at positions where the angles of light hitting the subject are different from each other, and are configured to irradiate the document with light from different directions. Thereby, the discriminability between the document and the placement unit 16 is improved.

The operation panel 22 includes a display screen, and is configured to set the image forming apparatus 10. The operation panel 22 is installed on the column 26 between the placement unit 16 and the imaging device 18, at the back of the apparatus body 12.

Figure 2:
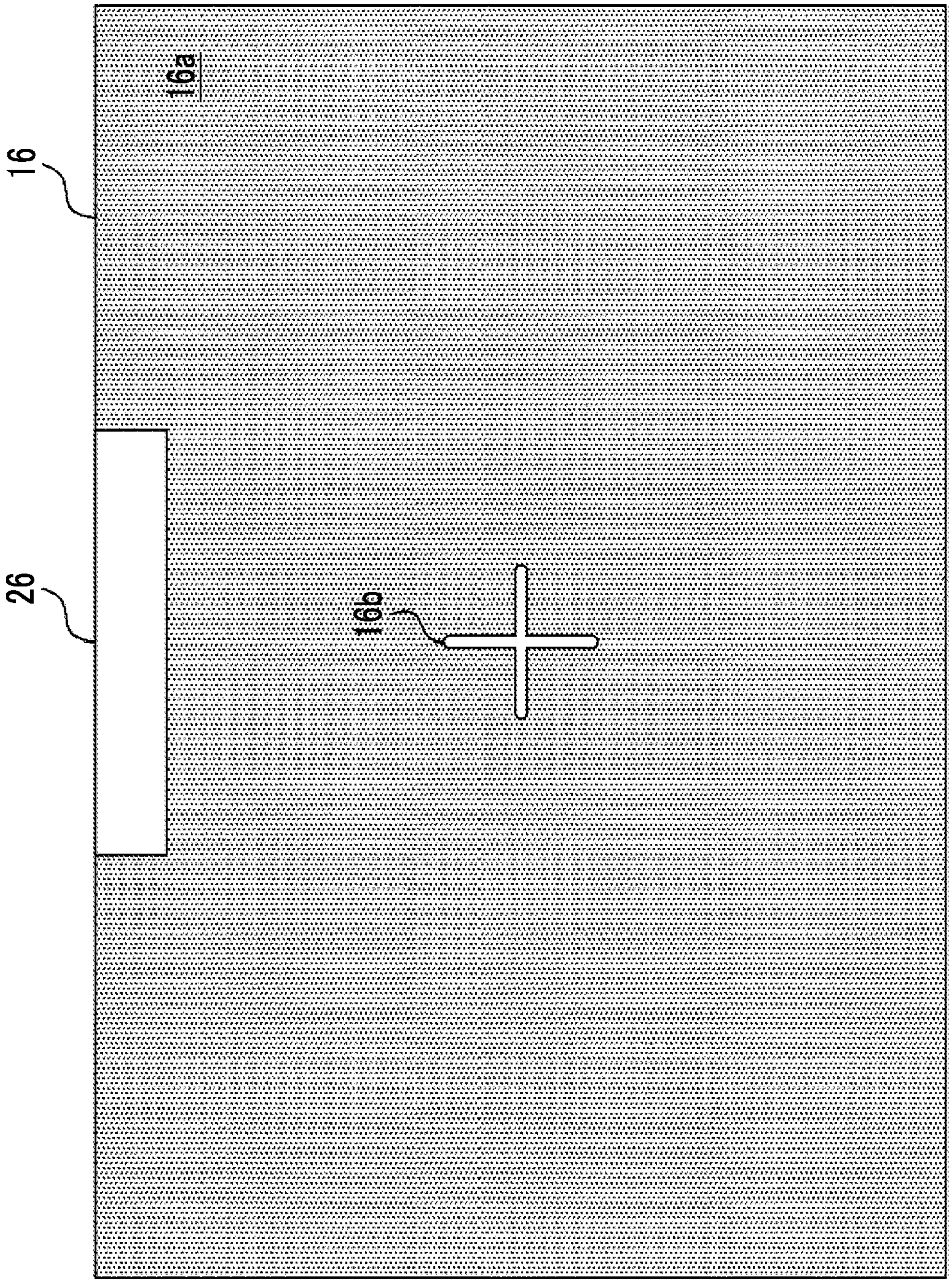
FIG. 2 is a top view showing the appearance of the placement unit and the light emitting device.
Figure 3:
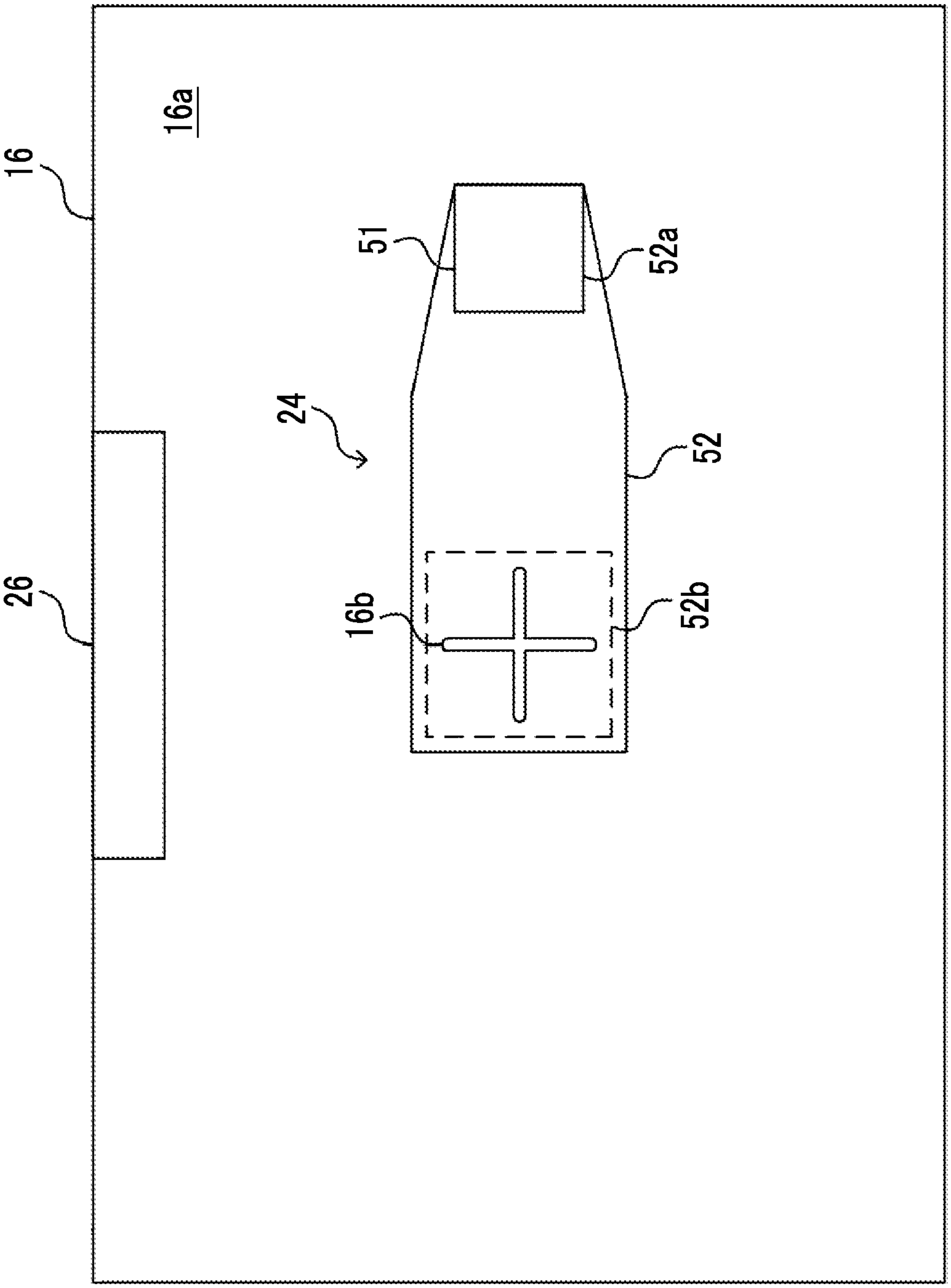
FIG. 3 is a top view for explaining the configurations of the placement unit and the light emitting device.
Figure 4:
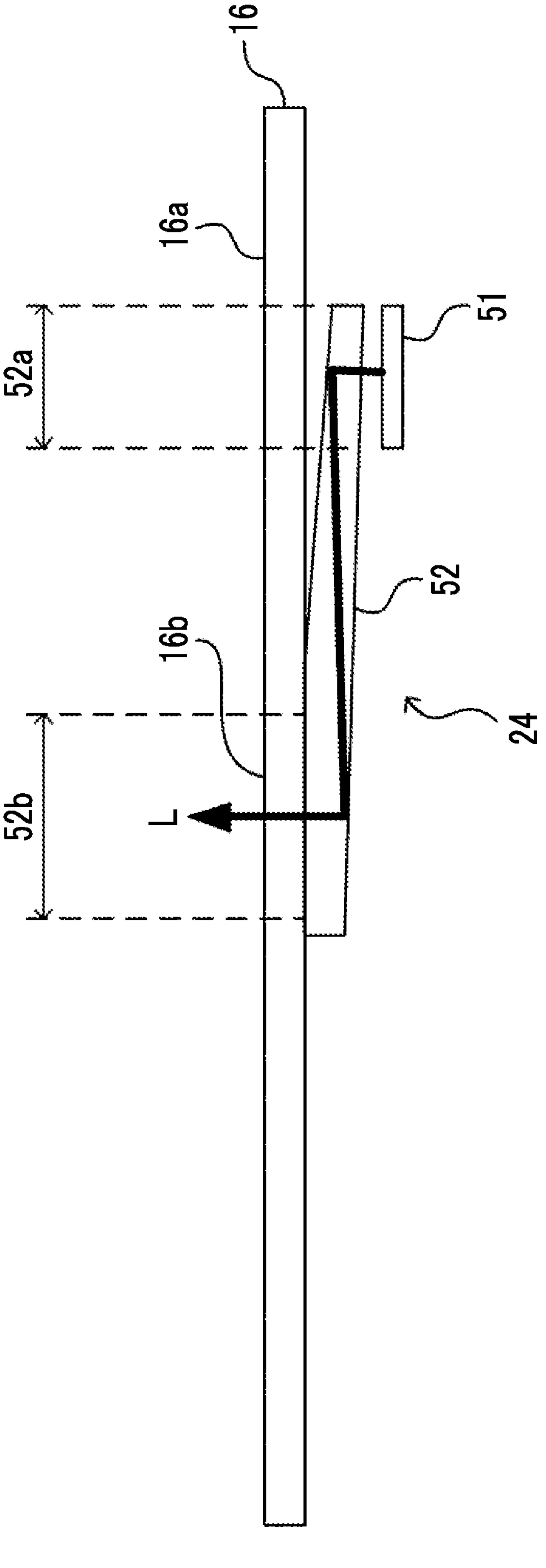
FIG. 4 is a front view for explaining the configurations of the placement unit and the light emitting device.

Next, the configurations of the placement unit 16 and the light emitting device 24 will be described in detail. FIG. 2 is a top view showing the appearance of the placement unit 16 and the light emitting device 24. FIG. 3 is a top view for explaining the configurations of the placement unit 16 and the light emitting device 24. FIG. 4 is a front view for explaining the configurations of the placement unit 16 and the light emitting device 24.

As shown in FIG. 2, the placement unit 16 includes a placement surface 16*a* on which a document is placed. Further, a light emitting portion 16*b* is formed at a central portion of the placement surface 16*a*. In the example shown in FIG. 2, the light emitting portion 16*b* has a cross shape as an example, but in addition, for example, any form may be used, such as a rectangle, a circle, a text, a symbol, or a combination of some of the examples.

The top surface of the apparatus body 12 which is the placement surface 16*a* is made of a light-transmitting resin, and a region of the placement surface 16*a* excluding the light emitting portion 16*b* is coated with a light-shielding paint of black or the like.

In the placement unit 16 configured as described above, the light emitting portion 16*b* appears to emit light, by emitting light from below the light emitting portion 16*b* with the light emitting device 24 to be described later.

In a case where a part of the outer surface of the housing is the placement unit 16 for a document, the user may not know whether to place the document on the placement unit 16. Therefore, it is possible to prompt the user to place the document on the placement unit 16, by providing the light emitting portion 16*b* in the placement unit 16 in this way and causing at least a part of the placement unit 16 to emit light.

The configuration of the placement unit 16 is not limited to the above configuration, and, for example, may be configured in any manner that the top surface of the apparatus body 12, configuring the placement unit 16, is made of a light-shielding resin, the light emitting portion 16*b* is opened on the light-shielding top surface, and the light emitting portion 16*b* is sealed with a light transmitting member.

As shown in FIGS. 3 and 4, the light emitting device 24 is disposed at a central portion of the placement unit 16 in a case where the placement unit 16 is viewed from above. The light emitting device 24 includes a light source 51, a light guide unit 52, and the like.

The light source 51 is a light emitting element such as a Light Emitting Diode (LED) or an Organic Light Emitting Diode (OLED).

The light guide unit 52 includes a light input portion 52*a* and a light output portion 52*b*. The light guide unit 52 may have any configuration as long as the light received from the light input portion 52*a* is emitted from the light output portion 52*b*, and may be, for example, a lens formed of resin, glass, or the like, or a box body configured such that an inner surface reflects light. In the present exemplary embodiment, the light guide unit 52 is formed of a white resin, and is a box body in which the light input portion 52*a* and the light output portion 52*b* are opened.

The light source 51 is disposed at a position facing the light input portion 52*a*. Further, the light emitting portion 16*b* of the placement unit 16 is disposed at a position facing the light output portion 52*b*.

The light L emitted from the light source 51 enters from the light input portion 52*a* of the light guide unit 52, is reflected in the box body, and is emitted from the light output portion 52*b*. The light L emitted from the light output portion 52*b* is emitted from below the light emitting portion 16*b* of the placement unit 16. As a result, in a case where the placement unit 16 is viewed from the outside of the image forming apparatus 10, the light emitting portion 16*b* appears to emit light.

Figure 5:
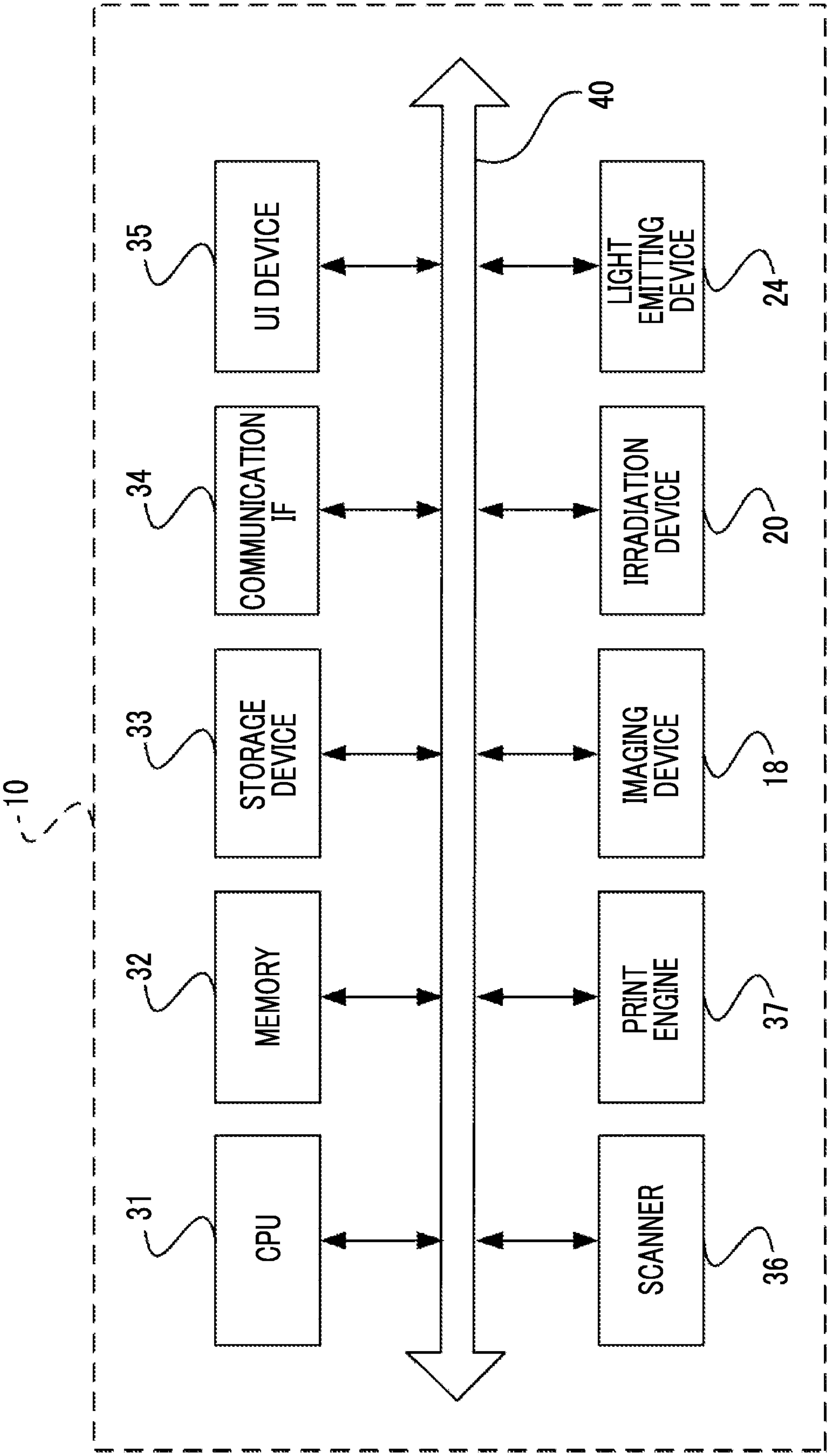
FIG. 5 is a block diagram showing a hardware configuration of the image forming apparatus.

Next, the hardware configuration of the image forming apparatus 10 of the present exemplary embodiment will be described. FIG. 5 is a block diagram showing a hardware configuration of the image forming apparatus 10.

As shown in FIG. 5, the image forming apparatus 10 includes a CPU 31, a memory 32, a storage device 33 such as a hard disk drive, a communication interface (abbreviated as IF) 34 that transmits and receives data to and from an external device or the like via a network, a user interface (abbreviated as UI) device 35 including a touch panel or a liquid crystal display, and a keyboard, a scanner 36, a print engine 37, the imaging device 18, an irradiation device 20, and a light emitting device 24. These components are connected to each other via the control bus 40.

The communication IF 34 transmits and receives data to and from an external device or the like. The UI device 35 receives an instruction input from the user. The scanner 36 scans the document loaded in the image forming apparatus 10 as image data. The print engine 37 prints an image on a recording medium such as printing paper through steps such as charging, exposure, development, transfer, and fixing.

The CPU 31 is a processor that controls the operation of the image forming apparatus 10 by executing a predetermined process based on a control program stored in the memory 32 or the storage device 33. In the present exemplary embodiment, it has been described that the CPU 31 reads and executes the control program stored in the memory 32 or the storage device 33, but the present invention is not limited thereto. The control program may be provided in a form recorded on a computer-readable recording medium. For example, this program may be provided in the form recorded on an optical disk such as a compact disc (CD)-read only memory (ROM) and a digital versatile disc (DVD)-ROM, or the form recorded on a semiconductor memory such as a universal serial bus (USB) memory and a memory card. Further, the control program may be acquired from an external device via a communication line connected to the communication IF 34.

Figure 6:
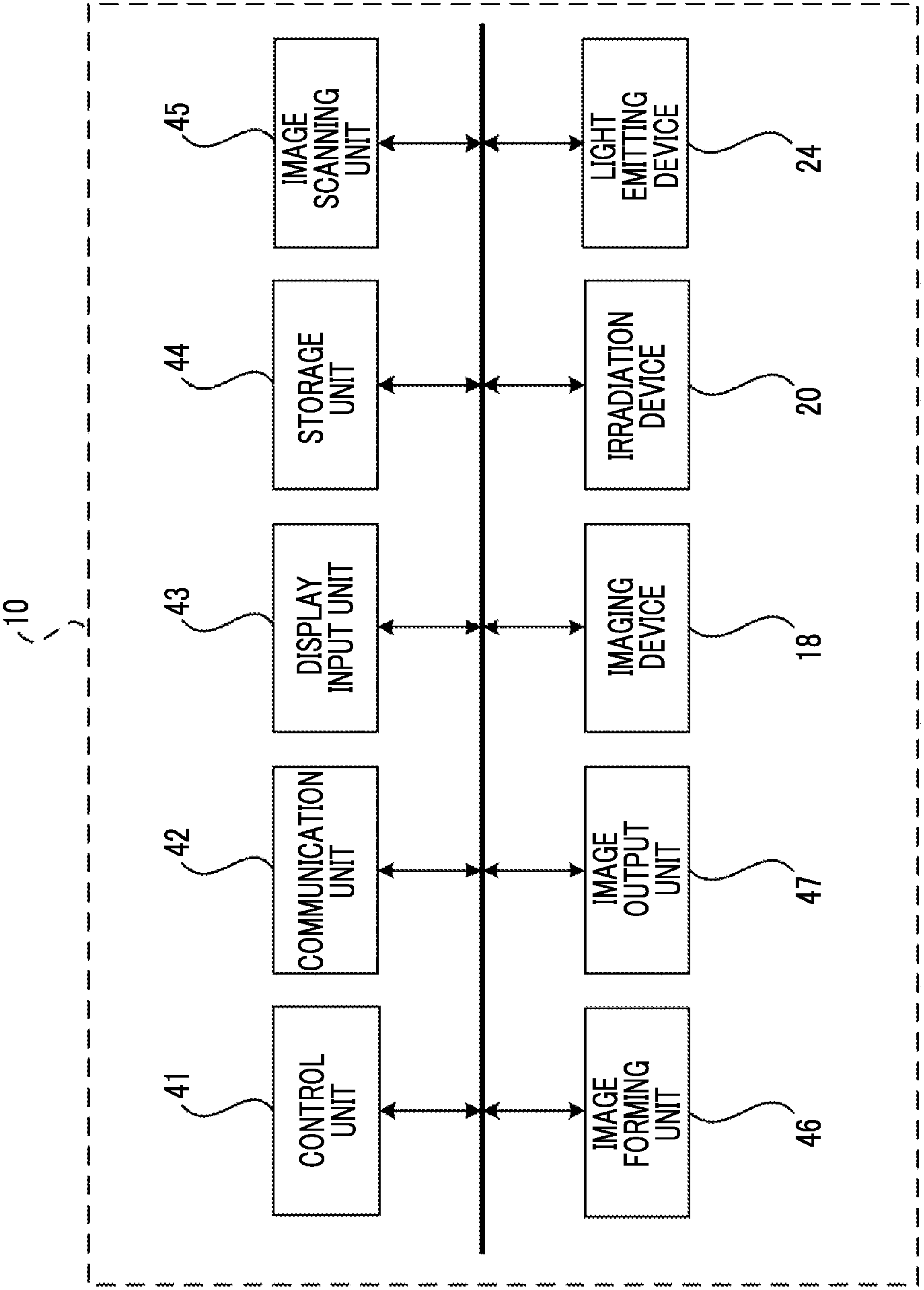
FIG. 6 is a block diagram showing a functional configuration of the image forming apparatus.

Next, the functional configuration of the image forming apparatus 10 of the present exemplary embodiment will be described. FIG. 6 is a block diagram showing a functional configuration of the image forming apparatus 10.

As shown in FIG. 6, the image forming apparatus 10 includes a control unit 41, a communication unit 42, a display input unit 43, a storage unit 44, an image scanning unit 45, an image forming unit 46, an image output unit 47, an imaging device 18, an irradiation device 20, and a light emitting device 24.

The control unit 41 controls the overall operation of the image forming apparatus 10, and in addition to controlling the light emission of the light emitting device 24, for example, based on an instruction input from the user, performs control of imaging the document by the imaging device 18, control of outputting printing data such as a document image by the image output unit 47, or the like.

The communication unit 42 transmits and receives data to and from an external device. The display input unit 43 displays various types of information on the display screen of the operation panel 22, based on the control by the control unit 41. Further, the display input unit 43 inputs various types of operation information performed by the user on the operation panel 22. The display input unit 43 is an example of a display unit in the technique of the present disclosure. The storage unit 44 stores various types of data such as image data generated by the control unit 41 in addition to the control program.

The image scanning unit 45 performs a scanning operation of scanning various documents, based on the control by the control unit 41. The image forming unit 46 forms an image to be output from the image output unit 47, based on the control by the control unit 41. The image output unit 47 outputs the image formed by the image forming unit 46 onto a recording medium such as printing paper, based on the control by the control unit 41.

In a case where it is detected that a document is placed on the placement unit 16, the image forming apparatus 10 of the present exemplary embodiment can image the document without receiving an instruction from the user. Hereinafter, such imaging is referred to as automatic imaging.

As a method of detecting that a document is placed on the placement unit 16, any detection method may be used such as detection using an image captured by the placement unit 16 by the imaging device 18, or detection by mounting a sensor for detecting that the document is placed on the placement unit 16.

In a case of the detection using an image captured by the placement unit 16 by the imaging device 18, any detection method may be used in such a manner that for example, a document image is extracted from the captured image, and in a case where the position of the document image does not change for a certain period of time, it is determined that the document is placed.

In a case where the document placed on the placement unit 16 is imaged by such automatic imaging, or in a case where a user manually images the document placed on the placement unit 16, in a case where the light emitting portion **16*b* of the placement unit 16** emits light, it may affect the imaging of the document.

Therefore, the control unit 41 controls the light emitting device 24 not to emit light, in a case where it is detected that the document is placed on the placement unit 16.

In the image forming apparatus 10 of the present exemplary embodiment, in a case where it is not detected that the document is placed on the placement unit 16, the control unit 41 may control the light emitting device 24 to emit light.

Further, the light emitted by the light emitting device 24 may be light emitted by blinking.

Further, the control unit 41 may control the light emitting device 24 not to emit light, in a case where the image processing apparatus is not operated for a set time or longer.

Further, the control unit 41 may control the light emitting device 24 not to emit light, in a case where a selection screen for selecting a function to be used in the image processing apparatus is displayed on the operation panel 22 which is the display input unit 43.

Figure 7:
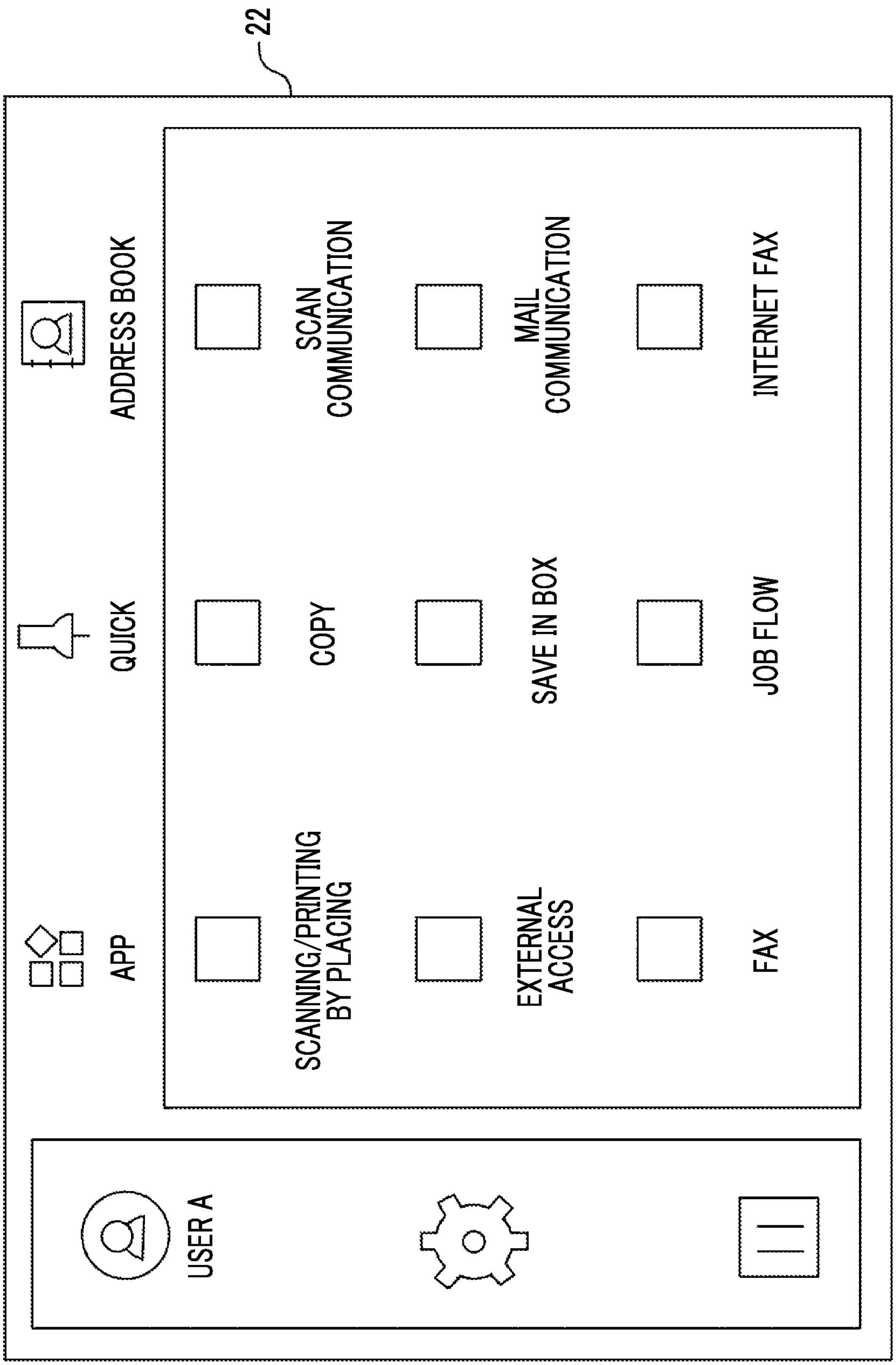
FIG. 7 is a diagram showing an example of a selection screen.

As shown in FIG. 7, for example, the selection screen is a screen configured to enable selection of a function to be used in the image processing apparatus, such as "scanning/printing by placing", "copy", and "scan transmission". In addition, in FIG. 7, the "scanning by placing" means the above automatic imaging.

Further, the control unit 41 may control the light emitting device 24 not to emit light, in a case where an operating state of the image processing apparatus is a power saving state.

In this case, in a case where the operating state of the image processing apparatus returns to a normal operating state from the power saving state, and the automatic imaging is set, the control unit 41 may control the light emitting device 24 to emit light.

Further, the control unit 41 may control the light emitting device 24 not to emit light, until an authentication process is completed, in a case where the image processing apparatus performs the authentication process of the user.

In this case, the control unit 41 may control the light emitting device 24 to emit light, in a case where the authentication process is completed and the automatic imaging is set.

Figure 8:
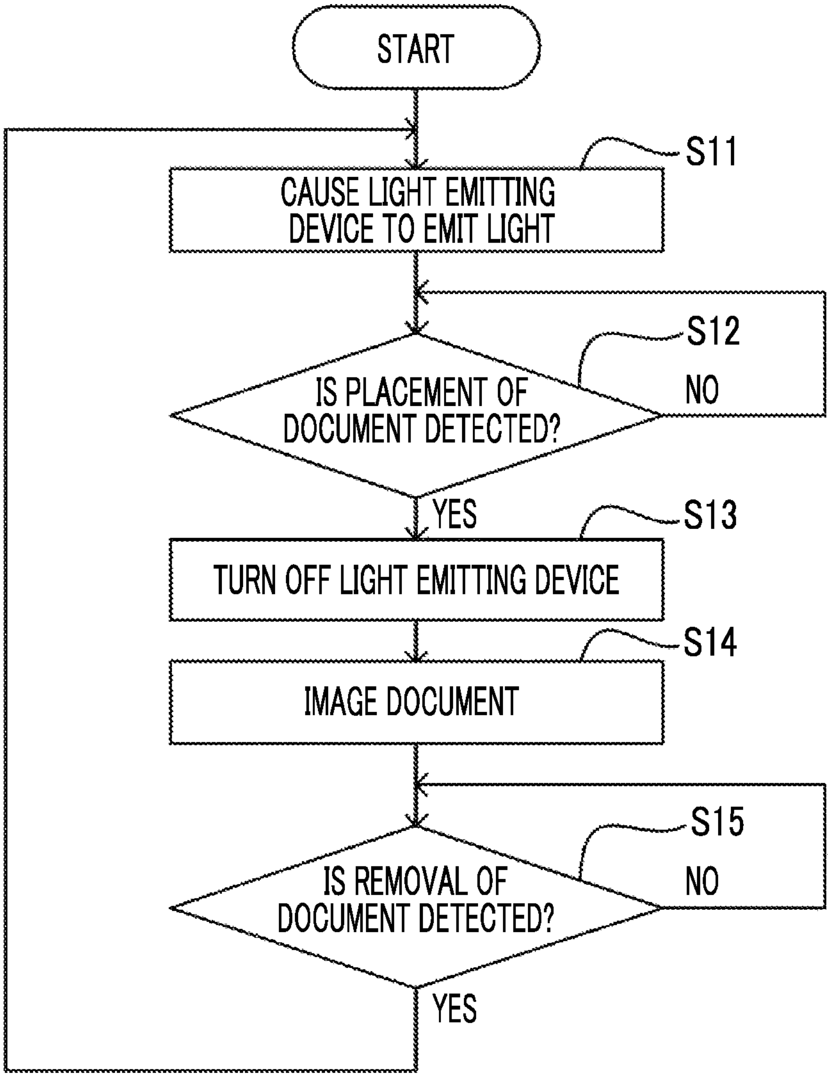
FIG. 8 is a flowchart showing a processing flow at the time of imaging a document in the image forming apparatus.

Next, a process at the time of imaging a document in the image forming apparatus 10 of the present exemplary embodiment will be described with reference to the flowchart of FIG. 8.

First, in step S11, the control unit 41 causes the light emitting device 24 to emit light in order to cause the light emitting portion **16*b* of the placement unit 16** to emit light.

Next, in step S12, the control unit 41 determines whether or not it has been detected that the document is placed on the placement unit 16.

In a case where it is determined in step S12 that the placement of the document is not detected, the control unit 41 repeats the determination in step S12 until the placement of the document is detected.

In a case where it is determined in step S12 that the placement of the document is detected, the control unit 41 turns off the light emitting device 24 in step S13.

Next, the control unit 41 performs the imaging of the document in step S14. Here, the imaging of the document in step S14 will be described in detail.

In a case where the placement of the document is detected, the control unit 41 displays the live view image on the display input unit 43. The user can check the state of the document while viewing the live view image. In a case where the position of the document image does not change for a certain period of time in the live view image, the control unit 41 performs the imaging of the document, and displays the acquired image of the document as a preview image on the display input unit 43. After that, in a case where an instruction to save or print the image is input from the user, the control unit 41 performs a process according to the user's instruction.

Next, in step S15, the control unit 41 determines whether or not it has been detected that the document placed on the placement unit 16 has been removed.

In a case where it is determined in step S15 that the removal of the document is not detected, the control unit 41 repeats the determination in step S15 until the removal of the document is detected.

In a case where it is determined in step S15 that the removal of the document is detected, the control unit 41 transitions to step S11 and causes the light emitting device 24 to emit light in order to cause the light emitting portion 16*b* of the placement unit 16 to emit light.

Modification Example

Although the image forming apparatus according to the exemplary embodiment of the present invention has been described above, the present invention is not limited to the above exemplary embodiment and may be appropriately modified.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, in the above exemplary embodiment, the case where the present invention is applied to the multifunction machine as the image forming apparatus has been described, but the present invention is not limited thereto, and the present invention can also be applied to various types of image processing apparatuses such as a scanner.

Supplementary Notes

Hereinafter, aspects of the present disclosure will be described.

(((1)))

An image processing apparatus comprising:
- a placement unit that is provided on an upper surface of a housing and on which a document is placed;
- an imaging unit that images the placement unit from above;
- a light emitting device that causes at least a part of the placement unit to emit light; and
- a processor configured to:
  - control the light emitting device not to emit light, in a case where it is detected that the document is placed on the placement unit.

(((2)))

The image processing apparatus according to (((1))), wherein the processor is configured to:
- control the light emitting device to emit light, in a case where it is not detected that the document is placed on the placement unit.

(((3)))

The image processing apparatus according to (((1))) or (((2))),
- wherein light emission by the light emitting device is light emission by blinking.

(((4)))

The image processing apparatus according to any one of (((1))) to (((3))), wherein the processor is configured to:
- control the light emitting device not to emit light, in a case where the image processing apparatus is not operated for a set time or longer.

(((5)))

The image processing apparatus according to any one of (((1))) to (((4))), wherein the processor is configured to:
- control the light emitting device not to emit light, in a case where a selection screen for selecting a function to be used in the image processing apparatus is displayed on a display unit.

(((6)))

The image processing apparatus according to any one of (((1))) to (((5))), wherein the processor is configured to:
- control the light emitting device not to emit light, in a case where an operating state of the image processing apparatus is a power saving state.

(((7)))

The image processing apparatus according to (((6))), wherein the processor is configured to:
- control the light emitting device to emit light, in a case where the operating state of the image processing apparatus returns to a normal operating state from the power saving state, it is detected that the document is placed on the placement unit, and it is set to image the document without receiving an instruction from a user.

(((8)))

The image processing apparatus according to any one of (((1))) to (((7))), wherein the processor is configured to:
- control the light emitting device not to emit light, until an authentication process of the user is completed, in a case where the image processing apparatus performs the authentication process.

(((9)))

The image processing apparatus according to (((8))), wherein the processor is configured to:
- control the light emitting device to emit light, in a case where the authentication process is completed, it is detected that the document is placed on the placement unit, and it is set to image the document without receiving an instruction from the user.

(((10)))

A program for controlling an image processing apparatus including a placement unit that is provided on an upper surface of a housing and on which a document is placed, an imaging unit that images the placement unit from above, a light emitting device that causes at least a part of the placement unit to emit light, and a processor, the program causing a computer to execute a process comprising:
- controlling the light emitting device not to emit light, in a case where it is detected that the document is placed on the placement unit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:

a placement unit that is provided on an upper surface of a housing and on which a document is placed;

an imaging sensor that images the placement unit from above;

a light emitting device that emits light from below the placement unit and causes at least a part of the placement unit to emit the light; and a processor configured to:

control the light emitting device not to emit light and the imaging sensor to image the document, in a case where it is detected that the document is placed on the placement unit.

2. The image processing apparatus according to claim 1, wherein the processor is configured to:

control the light emitting device to emit light, in a case where it is not detected that the document is placed on the placement unit.

3. The image processing apparatus according to claim 1, wherein light emission by the light emitting device is light emission by blinking.

4. The image processing apparatus according to claim 1, wherein the processor is configured to:

control the light emitting device not to emit light, in a case where the image processing apparatus is not operated for a set time or longer.

5. The image processing apparatus according to claim 1, wherein the processor is configured to:

control the light emitting device not to emit light, in a case where a selection screen for selecting a function to be used in the image processing apparatus is displayed on a display unit.

6. The image processing apparatus according to claim 1, wherein the processor is configured to:

control the light emitting device not to emit light, in a case where an operating state of the image processing apparatus is a power saving state.

7. The image processing apparatus according to claim 6, wherein the processor is configured to:

control the light emitting device to emit light, in a case where the operating state of the image processing apparatus returns to a normal operating state from the power saving state, it is detected that the document is placed on the placement unit, and it is set to image the document without receiving an instruction from a user.

8. The image processing apparatus according to claim 1, wherein the processor is configured to:

control the light emitting device not to emit light, until an authentication process of the user is completed, in a case where the image processing apparatus performs the authentication process.

9. The image processing apparatus according to claim 8, wherein the processor is configured to:

control the light emitting device to emit light, in a case where the authentication process is completed, it is detected that the document is placed on the placement unit, and it is set to image the document without receiving an instruction from the user.

10. A non-transitory computer readable medium storing a program for controlling an image processing apparatus including a placement unit that is provided on an upper surface of a housing and on which a document is placed, an imaging sensor that images the placement unit from above, a light emitting device that emits light from below the placement unit and causes at least a part of the placement unit to emit the light, and a processor, the non-transitory computer readable medium storing the program causing a computer to execute a process comprising:

controlling the light emitting device not to emit light and the imaging sensor to image the document, in a case where it is detected that the document is placed on the placement unit.

11. An image processing method for controlling an image processing apparatus including a placement unit that is provided on an upper surface of a housing and on which a document is placed, an imaging sensor that images the placement unit from above, a light emitting device that emits light from below the placement unit and causes at least a part of the placement unit to emit the light, and a processor, the method comprising:

controlling the light emitting device not to emit light and the imaging sensor to image the document, in a case where it is detected that the document is placed on the placement unit.

* * * * *